Jan. 12, 1965 J. F. VAUGHEN 3,164,911
HELICOPTER FLIGHT TRAINER
Filed Feb. 16, 1961 4 Sheets-Sheet 1
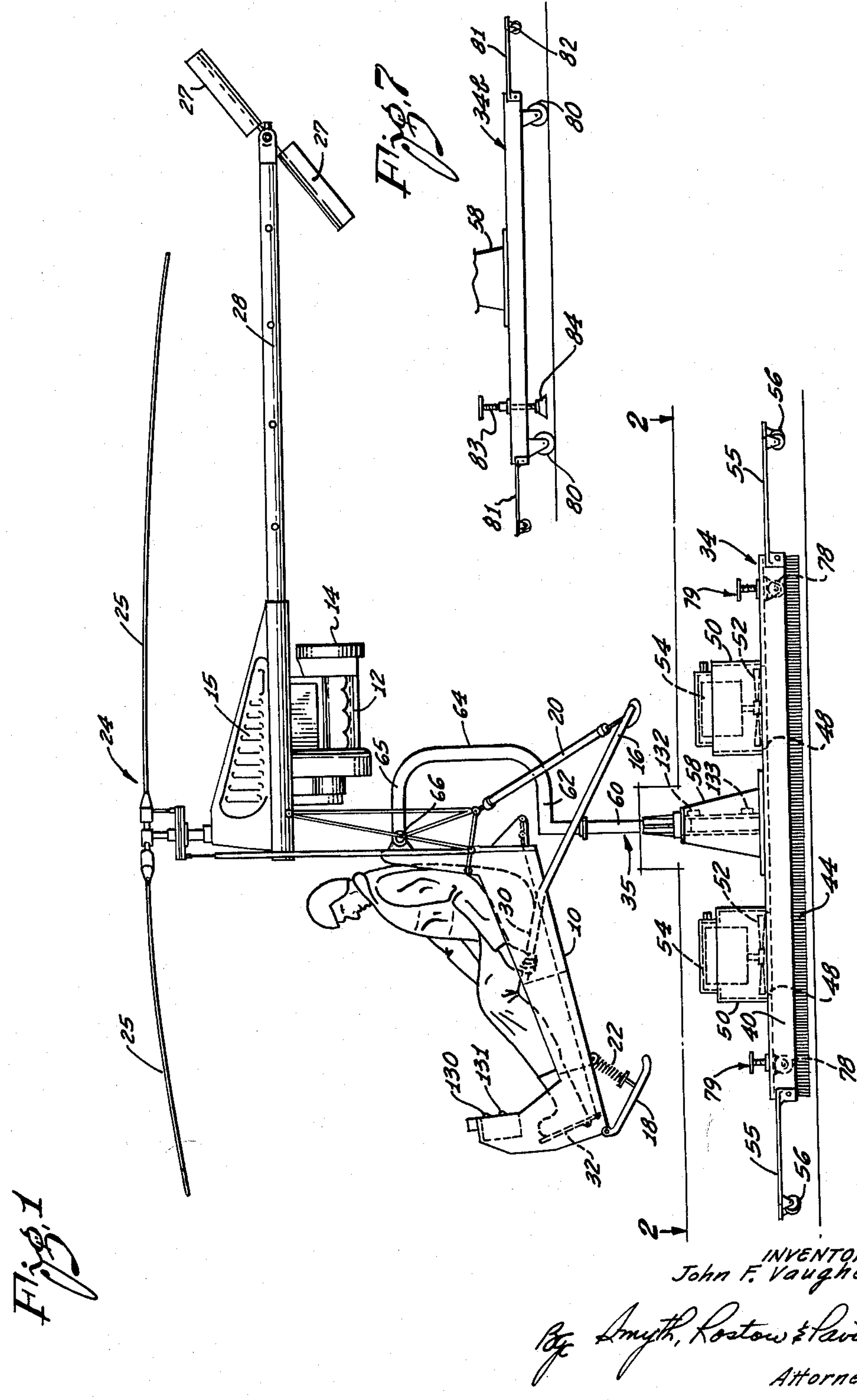
INVENTOR:
John F. Vaughen
By Smyth, Roston & Pavitt
Attorneys HELICOPTER FLIGHT TRAINER
Filed Feb. 16, 1961 4 Sheets-Sheet 2
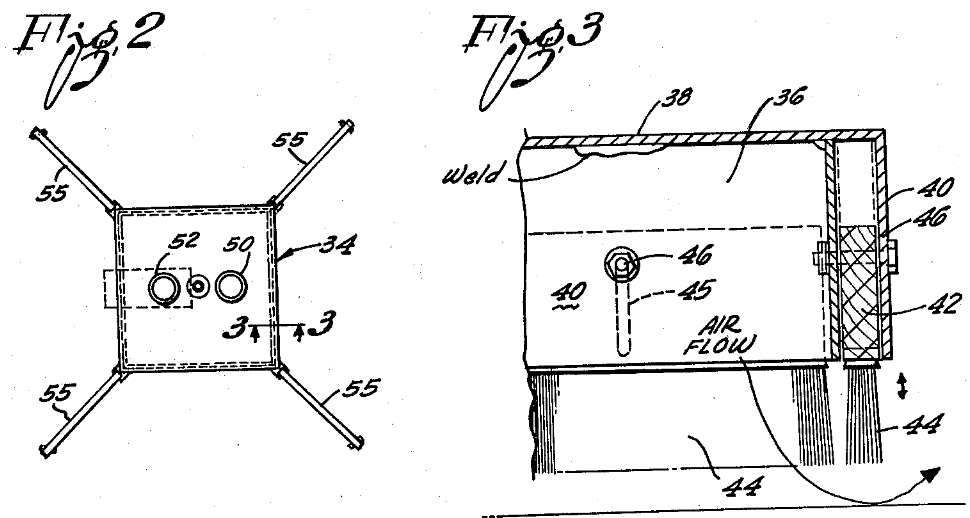
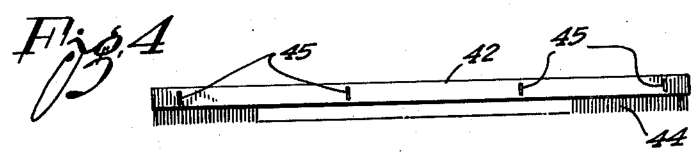
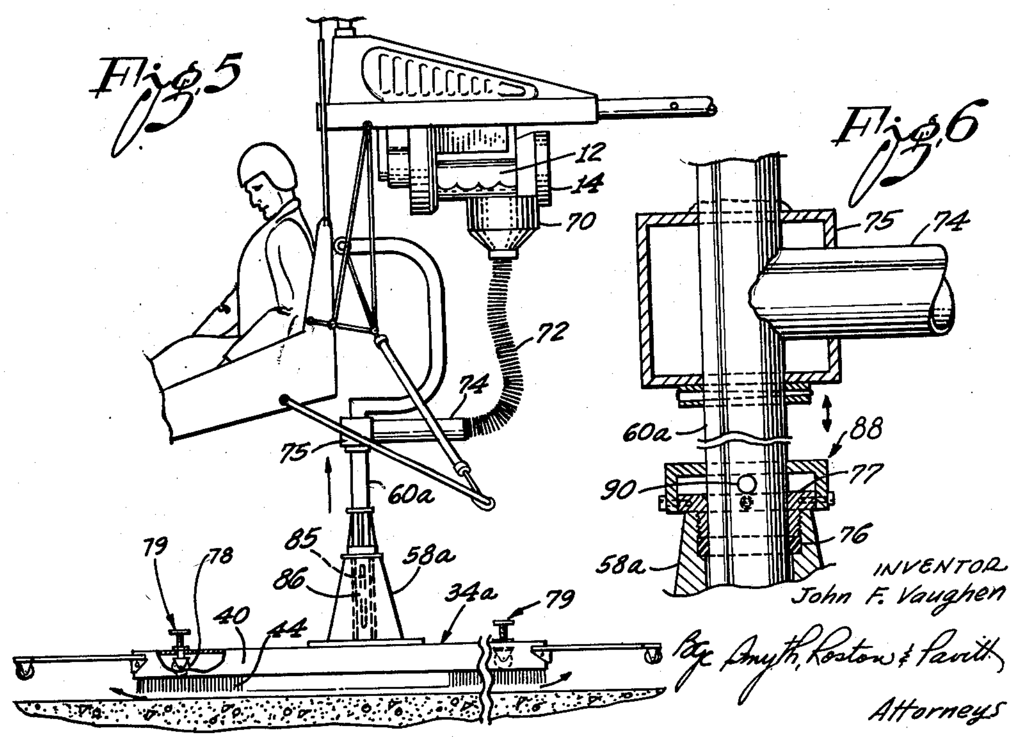
INVENTOR
John F. Vaughen
By Smyth, Roston & Pavitt
Attorneys INVENTOR:
John F. Vaughen
By Smyth, Roston & Pavitt
Attorneys

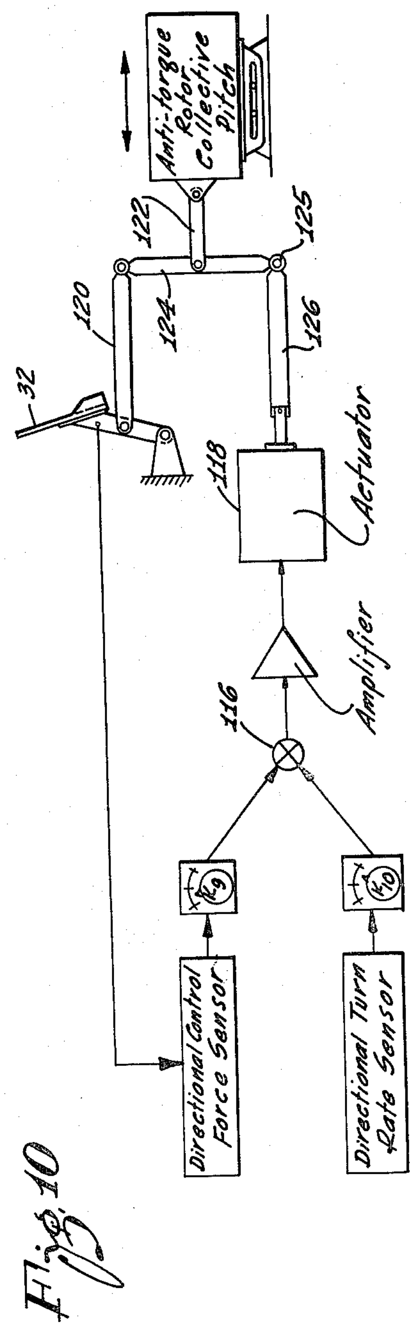
Fig. 10
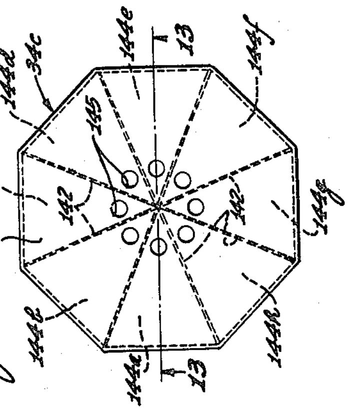
Fig. 12
Fig. 13
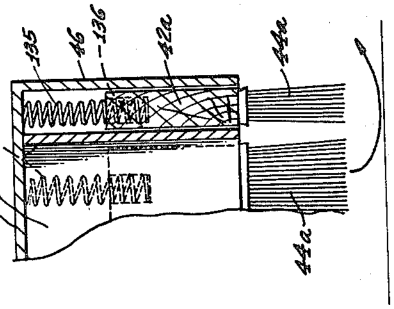
Fig. 11
INVENTOR:
John F. Vaughen
By Smyth, Roston & Pavitt
Attorneys

United States Patent Office 3,164,911
Patented Jan. 12, 1965

3,164,911

HELICOPTER FLIGHT TRAINER

John F. Vaughen, Palos Verdes, Calif., assignor to Del Mar Engineering Laboratories, Los Angeles, Calif., a corporation of California Filed Feb. 16, 1961, Ser. No. 89,697
27 Claims. (Cl. 35—12)

This invention relates to an apparatus for training a student pilot to fly a hovering type aircraft. While the invention is applicable to flight training for any type of hovering aircraft, it has special utility for training helicopter pilots. The description herein of a helicopter trainer will provide adequate guidance for those skilled in the art who may have occasion to apply the same principles for training pilots for other types of hovering aircraft.

The flight controls of a helicopter are necessarily complex to allow full exploitation of its capability to move in all directions. The primary control of cyclic pitch of the main rotor blades employs a control stick which, in general, directs the aircraft in the direction of the shift of the stick and controls the attitude of the helicopter in space. The vertical direction of movement of the helicopter is controlled by the collective pitch of the main rotor blades; the aircraft rising if the collective pitch stick is lifted and vice versa. The yaw or angular direction of the fuselage is controlled by rudder pedals similar to those employed by fixed-wing aircraft. In the conventional helicopter these pedals control the collective pitch of the anti-torque rotor blades.

Because of the varying power requirements of a helicopter and its sensitivity to direction of movement, the throttle on the engine is constantly monitored. If the collective pitch is lifted the throttle setting must be simultaneously increased by the pilot and vice versa.

The basic flight characteristics of a helicopter result in the interaction of feed-back effects among the various controls. For example, a forward shift of the cyclic pitch control stick, resulting in higher forward velocity, increases the rotor lift and requires decrease in the collective pitch to maintain the same altitude. The decrease in collective pitch, in turn, results in a lower power requirement and requires a slight reduction in the throttle. Because the throttle reduction decreases the torque effect of the main rotor a corresponding adjustment of pedal pressure is required to maintain the given direction.

As a result of this complex interrelationship of the flight controls of a helicopter, a great deal of skill and dexterity is required on the part of the pilot and he is subject to a higher degree of tension and fatigue than the pilot of a fixed-wing aircraft. The situation is made more difficult by the fact that a trainer helicopter is necessarily a relatively small helicopter and the above mentioned feed-back effects among the various controls is especially pronounced in the smaller, more agile helicopters. It may be readily appreciated why normal flight training for a helicopter pilot requires approximately twice as much time as the normal flight training of a fixed-wing pilot.

A basic problem to which this invention is directed is to provide actual flight control practice with a helicopter with perfect safety for the student pilot. For this purpose the airborne flight must be close to ground level and there must be some safeguard to keep the aircraft from overturning with fatal results if the student pilot makes an error in control.

One prior art training procedure is to tether a helicopter to limit the rise of the helicopter from ground level. A serious disadvantage of such an arrangement, however, is that it affords no freedom for horizontal travel or forward flight of the helicopter. If a number of men, say three men, hold the tethers some horizontal travel of the helicopter is permitted but only at a slow rate. Greater freedom for horizontal travel may be provided by tethering the helicopter to a mobile wheeled carriage. However, any tethered arrangement restricts the motion of a helicopter so greatly that it is impossible for a student pilot to develop a true feel of its highly sensitive control characteristics.

Another prior art training practice is to mount a helicopter on an inflated float that is provided with outriggers to keep the float from turning over. This arrangement provides mobility for only very low speed horizontal travel of the aircraft. If the helicopter is fixedly attached to the float, however, and the float stays on the water for safety, the trainee is not given practice in actual airborne flight. Also, training sites are limited to water surfaces only.

The present invention meets the general problem by providing an aircraft assembly of the helicopter type and by pivotally connecting the aircraft to a mobile base or base structure. The pivotal connection also has freedom for a limited range of vertical movement relative to the mobile base to permit unrestricted airborne flight of the aircraft within that range. In the initial embodiment of the invention, the aircraft has all of the essential parts of a helicopter including a seat for the student pilot, powered means for flight, and the usual flight controls for manipulation by the pilot. The base is highly mobile, being readily movable in any direction horizontally in response to aerodynamic thrust exerted by the aircraft to provide ample opportunity for flight travel of the aircraft. The mobile base is highly stable to resist tilting moments applied at the pivotal connection by the aerodynamic forces and thus eliminates the possibility of the aircraft overturning.

The stable base may be of any suitable type. For example, the base may be a float or a wheeled carriage. A feature of the preferred practice of the invention, however, is the use in the base of an air-cushion vehicle that is supported close to a ground surface or close to a water surface on a cushion of air without actual contact with the surface. This air cushion vehicle may be of any conventional type including, but not limited to, plenum chamber, momentum curtain, annular jet, and labyrinth. Such a base structure offers practically no resistance to horizontal movement, so horizontal speeds up to 30 or 40 miles per hour are feasible with this trainer. This allows the pilot to fly into the speed range which gives an additional lift, called "transitional lift." Flying through this range changes the torque. The pilot must learn to allow for torque changes with the rudder pedals, whether increasing or decreasing air speed into or out of the transitional lift range. No other method of tethered flight would allow training in this transitional lift regime.

The aircraft is connected to the mobile base by universal joint means that permits the aircraft to rotate about a vertical axis relative to the base and at the same time permits the aircraft to tilt in all lateral directions relative to the base. In the initial practice of the invention, the center of gravity of the loaded aircraft combined with the weight of the pilot is on or close to the vertical axis of rotation and is at or close to the tilt pivot center so that the connection with the base structure does not interfere with pilot induced changes of the aircraft in pitch attitude or changes in roll attitude or changes in heading.

The full freedom for angular movement of the aircraft relative to the base together with the freedom for change in level of the aircraft relative to the base through a given range of levels permits unrestrained airborne flight of the aircraft within this range of levels. The range of levels must be limited to keep the aerodynamic thrust of the aircraft assembly from applying an excessive tilting moment to the base structure. It is not difficult to provide a range of levels on the order of 12 inches and such a range is ample for flight training.

Some safeguard is necessary to keep the aircraft from lifting the base structure into the air. For this purpose the power plant on the aircraft may provide adequate lift to support the aircraft within the given range of levels but not enough lift to carry the added weight of the base structure. If there is reason to use an aircraft that is capable of lifting the base structure, the safeguard may comprise a physical limit on upward collective pitch travel limiting maximum lift to a value which is insufficient to lift the base structure. Alternatively, a throttle stop may be used to limit engine power to a value which is insufficient to lift the aircraft plus the mobile base.

A feature of the invention is the addition of an electromechanical variable stability system to the flight control. This is accomplished by installing modified Automatic Stabilization Equipment (ASE). The conventional ASE commands roll, pitch, and yaw attitude rates proportional to the pilot's control force, and when this control force is reduced to zero the ASE seeks to maintain the instant attitude of the helicopter. For the purpose of training a pilot, however, this ASE is modified in my invention to permit variation in the degree to which stabilization control is exercised. Any degree less than full stabilization leaves a margin of control to be exercised by the student pilot and rapid training is accomplished by progressively increasing this margin until the student pilot assumes the full burden of stabilization control.

A further feature of the invention is the concept of modifying the ASE to cause the training apparatus to simulate flight characteristics that are not inherent in the training aircraft itself. Thus the ASE may be modified to cause the training apparatus to assume a flight behavior that is peculiar to any desired size and type of helicopter.

All of the description to this point has related to a trainer for pilots of manned helicopters. It is also possible, however, to employ this invention as a trainer for drone helicopter pilots. In this embodiment of the invention the helicopter mounted on the ground cushion platform would have an automatic pilot and remote control radio receiver. The student drone helicopter pilot would then be stationed on the ground at some distance from the trainer and would control it remotely through a radio command link.

The features and advantages of the invention may be understood from the following detailed description together with the accompanying drawings.

In the drawings, which are to be regarded as merely illustrative:

FIG. 1 is a side elevation of a selected embodiment of the invention in the form of a helicopter trainer;

FIG. 2 is a reduced scale plan view of the base structure as seen along the line 2—2 of FIG. 1;

FIG. 3 is an enlarged fragmentary section taken as indicated by the line 3—3 of FIG. 2 and showing how the plenum chamber of the base structure may be provided with a yielding curtain on all sides;

FIG. 4 is a side elevation of one of the curtain members;

FIG. 5 is a side elevation of a second embodiment of the invention in which the power plant of the aircraft assembly creates the airflow for support of the base structure;

FIG. 6 is a fragmentary sectional view of a portion of the passage structure for delivering air to the base structure;

FIG. 7 is a fragmentary side elevational view illustrating the fact that the support structure may be in the form of a wheeled carriage;

FIG. 10 is a diagram of the portion of an automatic stabilization equipment that relates to the directional changes of the helicopter;

FIG. 11 is a fragmentary view similar to FIG. 3 showing how springs may be employed to urge the curtain members downward;

FIG. 12 is a plan view of a modified base structure showing how the base structure may form a plurality of plenum chambers for a desirable stabilizing action; and FIG. 13 is a section through the base structure taken as indicated by the line 13—13 of FIG. 12 and showing how the tipping of the base structure creates a correcting effect.

THE AIRCRAFT

Figure 8:
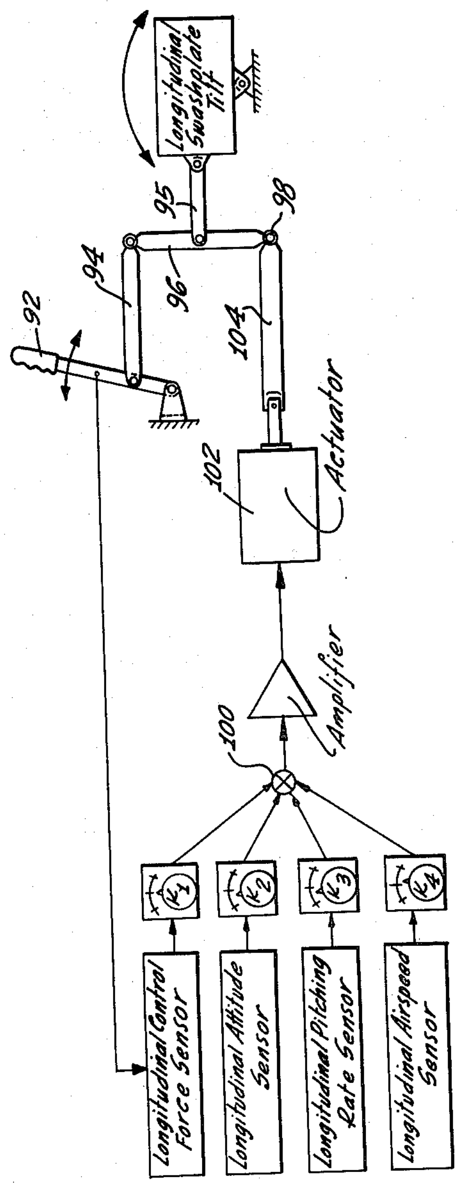
FIG. 8 is a diagram of the portion of an automatic stabilization equipment that relates to the longitudinal pitching motions of the helicopter.

FIG. 1 which illustrates a selected embodiment of the invention shows a helicopter trainer having a conventional fuselage which consists essentially of a framework carrying a pilot seat 10, an engine 12, and a fuel tank 15. The fuselage is provided with a landing support comprising two rear legs 16 and two forward skids 18. The trainer has the usual rotor assembly, generally designated 24, consisting of any number of blades 25 of airfoil cross section. The blades 25 are mounted to a hub of any conventional type with each blade being longitudinally pivoted to permit both cyclic and collective changes in pitch. The trainer also has the usual tail rotor blades 27 at the end of a rearwardly extending hollow beam 28 which beam encloses and conceals a drive shaft for the tail rotor blades and provides support for the control mechanism which is required for changing the pitch of the tail rotor blades.

A left hand control stick 30 controls the collective pitch of the main rotor blades 25 in the usual manner for varying the lift that is generated by the rotor assembly 24. A second control stick which is located between the pilot's knees is operated by the pilot's right hand and controls the cyclic pitch of the rotor assembly 24. A pair of rudder pedals 32 control the collective pitch of the tail rotor blades 27.

All of the helicopter structure described to this point is of conventional configuration using a main rotor with auxiliary anti-torque tail rotor. It should be pointed out, however, that the primary object of this invention, the use of a ground cushion platform to give the helicopter mobility while preventing it from tipping over, is equally applicable with any helicopter or other VTOL aircraft of different configuration or size than the one-man helicopter illustrated in FIG. 1. Other types of helicopters which might be employed, include, but are not limited to, coaxial rotor, tandem rotor, and lateral intermeshing rotor types. Each of these helicopters might have provisions for two or more pilots and any number of passengers or students. Also, although the helicopter shown in the figures has a pilot aboard, this invention has application to the training of drone helicopter pilots. In this case, the helicopter would carry only an automatic pilot and radio control receiver. The student drone helicopter pilot would be stationed on the ground at a point remote from the helicopter trainer and would control the trainer through a radio command link.

THE MOBILE BASE

As shown in FIG. 1 the aircraft is mounted on a mobile base or base structure, generally designated 34 by an upright connecting means, generally designated 35. In this particular embodiment of the invention, the mobile base structure 34 is an air-cushion vehicle which forms a plenum chamber 36 (FIG. 3) that is open at the bottom. As explained in the introduction, however, this air-cushion vehicle may be of any type including but not limited to plenum chamber, momentum curtain, annular jet, and labyrinth. The base 34 may also be of any convenient geometric platform although for illustration FIG. 2 shows a rectangular configuration in plan with a top wall 38 and four side walls 40.

Preferably the air-cushion plenum chamber 36 is surrounded by a flexible curtain and for this purpose each of the four side walls 40 is of the hollow configuration shown in FIG. 3 to slidingly confine a corresponding curtain member in the form of a bar 42 which carries downwardly extending brushlike bristles or other suitably flexible material 44. Each of the four bars 42 is provided with spaced vertical slots 45 as indicated in FIG. 4 and each of the hollow side walls is provided with corersponding bolts 46 which extend through the slots. This brush-type curtain is effective to retard the escape of air from the plenum chamber and serves to increase the spacing of the base structure from the ground surface. Each of the four curtain members readily yields to obstacles and may be retracted into the corresponding holow wall by an obstacle. If desired the curtain members may be flexible members such as bands or skirts made of plastic or elastomeric materials.

The air-cushion platform only has to lift its own weight since the weight of the helicopter is carried by the helicopter's lifting rotor. Therefore, for a platform of practical dimensions the relative positive air pressure required in the plenum chamber is only approximately $\frac{1}{100}$ of a pound per square inch above the ambient atmospheric pressure. Power is needed by the ground cushion platform only to replace the air that escapes from the plenum chamber. Because of the smal relative pressure in the plenum chamber, less than five horsepower are required to continuously replenish the plenum chamber. Suitable means for supplying air to the plenum chamber include but are not limited to the following:

(1) As shown in FIG. 1 the top wall 38 of the base structure may have one or more circular openings 48 each of which is surrounded by a cylindrical shroud 50. Mounted inside each of the cylindrical shrouds 50 is a fan 52 of any conventional type driven by power means 54. Each of said power means 54 may be an internal combustion reciprocating engine, a hydraulic motor, a gas turbine, or an electric motor. Current for said electric motor may be supplied either from a remote fixed source through a trailing cable or preferably it may be provided by a generator (not shown) which is driven by the engine 12 of the helicopter.

(2) The second embodiment of the invention shown in FIGS. 5 and 6 is largely identical with the first embodiment as indicated by the use of corresponding numerals to indicate corresponding parts. The only difference is that the replenishing air for the plenum chamber that is formed by the base structure 34*a* is supplied by a compressor 70 that is mounted on the aircraft engine 12 and is driven by the aircraft engine. The compressor 70 is connected by a flexible hose 72 with a nipple 74 that is welded onto the tubular column 60*a*. The airstream provided by the compressor 70 enters the tubular column 60*a* from the nipple 74 and passes down through the tubular column and the pedestal 58*a* to the plenum chamber in the base structure. The joint between the nipple 74 and the tubular column 60*a* may be reinforced in the manner indicated in FIG. 6. A hollow structure 75 encloses the joint and is welded to the tubular column 60*a* not only for the purpose of strengthening the joint but also for the purpose of reinforcing the tubular column in the region where the tubular column is cut away to form the joint. The sliding joint between the tubular column 60*a* and the pedestal 58*a* is sealed by a packing ring 76 that is secured under pressure by a gland 77.

(3) The third embodiment of the invention is largely identical with the second embodiment except that the exhaust gases from the engine 12 of the aircraft assembly are collected by the engine exhaust manifold (not shown) and introduced into the flexible tube 72.

An advantage of the air-supported base of the first embodiment is that it is inherently stable because if it tends to tilt in any given direction, it widens the gap under the base to release air on one side of the base and narrows the gas to restrict air on the other side of the base. Thus tilting of the base results in reducing the support pressure on one side and increasing the support pressure on the other side to provide automatic correction for the tilt. The base is so stable that it will permit a reasonable amount of travel of the center of gravity. The base 34 may be provided with diagonal outriggers 55 at its corners, as shown in FIGS. 1 and 2, to serve as safeguards to prevent the base from scraping the surface over which it floats. Alternatively the base may be made large enough in area to make the outriggers unnecessary. Preferably each of the outriggers is provided with a castering wheel 56.

When air flow to the plenum chamber is stopped, the base 34 rests on the ground in an immobilized manner with the curtain members 42 retracted. It may be desirable, however, to move the base structure from one location to another when the airflow is cut off. For this purpose, the base 34 may be provided with four casters 78 mounted on manually operable screws 79. Normally the casters are retracted so that when air flow stops the base is immobilized by resting on the ground. Whenever desired the screws 79 may be turned to advance the casters 78 to transfer the weight of the base to the casters.

FIG. 7 indicates how a wheeled base 34*b* may be substituted for the air-supported base 34 of FIG. 1. The base 34*b* comprises a carriage of any convenient geometric platform mounted on casters 80. The carriage is provided with diagonally positoned outriggers 81 having casters 82, the outriggers constituting a safeguard to ensure that the base 34*b* will not be tipped over by the aerodynamic forces developed by the aircraft. At least one screw 83 equipped with a foot pad 84 may be provided to immobilize the base 34*b* when desired. The foot pad 84 is normaly retracted above ground level but may be advanced into frictional engagement with the ground.

MOUNT OF AIRCRAFT ON MOBILE BASE

The aircraft is pivotally connected to the mobile base to alow the aircraft to tilt lateraly in all directions relative to the mobile base. The mounting structure also has freedom for a limited range of vertical movement and full 360° directional movement relative to the mobile base to permit unrestricted airborne flight of the aircraft within that range.

The upright connecting means 35 includes a hollow pedestal 58 that is rigidly mounted on the top wall 38 of the base structure. Slidingly and rotatably mounted in the hollow pedestal 58 is a tubular column 60. The upper portion of the tubular column 60 is C-shaped with a lower portion 62 extending radially away from the vertical axis of the pedestal, an intermediate portion 64 extending upward and an upper end portion 65 that returns to the axis of the pedestal. The aircraft is connected to the upper end of the tubular column by a ball joint 66. Thus, in effect, the base structure is pivotally connected to the aircraft assembly at a point on the aircraft assembly that is at the center of the ball joint, this point being at approximately the center of gravity of the loaded aircraft when the pilot is seated aboard. The center of the ball joint is also approximately on the axis of rotation of the tubular column in the pedestal 58.

The purpose of offsetting the upper portion of the tubular column 60 to provide the C-shaped configuration is to keep the tubular column from interfering with the freedom of the aircraft to tilt longitudinally and laterally about the center of the ball joint 66. With the ball joint permitting tilt of the aircraft in any lateral direction and with the tubular column 60 rotatably mounted in the pedestal 58, the upright connecting means 35 incorporates the equivalent of a universal joint that permits the aircraft to rotate relative to the base structure through the full azimuth and to assume any desired attitude. The freedom for the tubular column 60 to slide up and down inside the pedestal 58 approximately 12 inches provides a vertically restricted range of levels within which the aircraft may be airborne. The aircraft therefore has the freedom of motion that characterizes a freely airborne helicopter and is just as responsive to the flight controls as if it were freely airborne.

The manner in which the described embodiment of the invention serves its purpose may be readily understood from the foregoing description. The aircraft responds to the flight controls in the same manner as a conventional free flying helicopter. The student pilot may practice hovering within the 12 inch range of levels permitted by the upright connecting means 35 and since the base 34 is highly responsive to horizontal components of aerodynamic force created by the aircraft, the base will readily travel in any direction to give the student pilot practice in transitional airborne flight within the 12 inch range of levels. The pilot cannot get into serious trouble by tilting the aircraft because the base 34 is too stable to be tipped over by the aircraft.

It has been found useful to provide suitable indicating means to inform the student pilot when the aircraft reaches its maximum and minimum levels within the 12 inch range of levels. For this purpose an upper indicator lamp 130 to indicate when the maximum level is reached and a lower indicator lamp 131 to indicate the minimum level may be placed on the panel board of the aircraft as indicated in FIG. 1. A corresponding pair of limit switches 132 and 133 may be incorporated in the pedestal 58 for operation by the tubular column 60. When the tubular column 60 approaches its lower limit position relative to the pedestal 58 it closes the switch 133 to energize the indicating lamp 131 and when it approaches its upper limit position it closes the switch 132 to energize the lamp 130.

A feature of the invention that is apparent in FIG. 1 is that the mobile base structure extends laterally sufficiently to intercept the tilting of the aircraft assembly. Thus, if the aircraft assembly tilts to the maximum in any direction, the angle of tilt will be physically limited, and the aircraft assembly will be prevented from tilting into contact with the ground.

If desired, means may also be provided for separately locking the vertical motion and rotational motion of the sliding vertical column 60 or 60*a* relative to the pedestal 58 or 58*a*. This will make it possible for the student pilot to learn to use one flight control at a time. For example, if vertical motion is locked and rotational motion is free the pilot can practice operating directional control only, then if rotational motion is locked and vertical motion is free the pilot can practice operating vertical ilft (collective pitch) control only. Then both motions may be left free and the pilot can practice coordinating vertical and directional control simultaneously.

An illustrative method of separately locking vertical motion and directional motion is shown in FIGS. 5 and 6. The pedestal 58*a* has a vertical slot 85 on each side and the vertically sliding member 60*a* has a horizontal hole drilled through its center with diameters approximately equal to the width of the slot 85. Then when this hole is aligned with the slot 85 and a pin 86 is inserted through both members 58*a* and 60*a*, the slidable member 60*a* can rise vertically relative to the pedestal 58*a* but it is restrained by the pin 86 from rotating relative to the pedestal 58*a*. This allows the aircraft to rise relative to the base but restrains the aircraft from rotating about the vertical axis relative to the base.

To restrain vertical motion of the sliding member 60*a* while allowing it to rotate freely relative to the pedestal 58*a*, the pedestal 58*a* may be fitted with a removable collar 88 as shown in FIG. 6, a small space being provided between the inside horizontal surface of this collar and the top horizontal surface of the pedestal 58*a* as shown in FIG. 6. If desired the collar 88 may be made in two halves for ease of attachment to the pedestal 58*a*. A horizontal hole is drilled through the center of the sliding member 60*a*, the diameter of this hole being approximately equal to the vertical distance between the inside horizontal surface of the collar 88 and the top horizontal surface of the pedestal 58*a*. A pin 90 is then inserted through the hole in the sliding member 60*a*. The length of this pin is approximately equal to the inside diameter of the collar 88. With the pin 90 and the collar 88 in place, the member 60*a* can rotate freely relative to the pedestal 58*a* but is restrained from sliding vertically relative to the pedestal 58*a*.

VARIABLE STABILITY SYSTEM

It is contemplated that the aircraft may be provided with an electro-mechanical variable stability system. During training, this system may be utilized to provide either of the following two desirable effects:

*a*. The variable stability system can provide artifical stabilization to any degree desired with the balance of stabilization being provided by the student pilot. Thus the student can start training in a highly stabilized helicopter, then as he gains experience the effect of the artificial stabilization can be progressively decreased until the student is supplying the total stabilization required by the aircraft.

*b*. A second function of the variable stability system is to make the flight trainer simulate the flying qualities of other types of helicopters. This will make it possible to start training the student in the artificially stabilized flight trainer and then progressively change its flight handling characteristics to simulate those he will encounter in the helicopter to be flown during the next phase of his training.

The means by which these characteristics are achieved for the longitudinal motions and longitudinal control of the aircraft may be understood from reference to FIG. 8. The cyclic control stick 92 which is located between the pilot's knees may be moved fore and aft by the pilot. This motion is carried through push-pull tubes 94, 95 and the mixing linkage 96 to produce longitudinal tilt of the swashplate as shown schematically in FIG. 8. If the automatic stabilization equipment is turned off, the pivot point 98 remains fixed to the airframe and all the motion of the cyclic control stick 92 is transmitted through the lever system to the swashplate.

For longitudinal control, the artificial stabilization system operates in the following manner. Four sensors are employed as shown in FIG. 8 to sense:

*a*. Longitudinal control stick force
*b*. Longitudinal aircraft attitude in space
*c*. Longitudinal aircraft pitching rate
*d*. Longitudinal translational airspeed of the aircraft These sensors are readily available commercial components which are well known to those skilled in the art of automatic flight control. The electrical output signals from these sensors are passed through electrical gain control units $K_1$, $K_2$, $K_3$, $K_4$ and electrically mixed together at point 100. These signals are then amplified as required and used to drive the electro-mechanical actuator 102. The force from this actuator is transmitted through the push-pull rods 104, 95 and the mixing linkage 96 to produce longitudinal tilt of the swashplate as shown schematically in FIG. 8.

The effects of the gain controls $K_1$, $K_2$, $K_3$, $K_4$ will now be described:

*$K_1$ Varies Manual Control Sensitivity*

$K_1<0$; electronic system shifts point 98 in the appropriate direction to diminish manual control sensitivity $K_1=0$; electronic system has no effect on manual control sensitivity $K_1>0$; electronic system shifts point 98 in the appropriate direction to magnify manual control sensitivity

*$K_2$ Varies Static Attitude Stability and Natural Frequency*

$K_2<0$; electronic system maneuvers point 98 to diminish the static stability and natural frequency of the aircraft $K_2=0$; electronic system has no effect on the static stability and natural frequency of the aircraft $K_2>0$; electronic system maneuvers point 98 to increase the static stability and natural frequency of the aircraft

*$K_3$ Varies Dynamic Attitude Stability and Damping*

$K_3<0$; electronic system maneuvers point 98 to diminish the dynamic stability and damping of the aircraft $K_3=0$; electronic system has no effect on dynamic stability and damping of the aircraft $K_3>0$; electronic system maneuvers point 98 to increase the dynamic stability and damping of the aircraft

*$K_4$ Varies Translational Velocity Stability*

$K_4<0$; electronic system maneuvers point 98 to diminish the translational velocity stability of the aircraft $K_4=0$; electronic system has no effect on translational velocity stability of the aircraft $K_4>0$; electronic system maneuvers point 98 to increase the translational velocity stability of the aircraft By setting the gain controls $K_1$, $K_2$, $K_3$ and $K_4$ in the proper combination the longitudinal dynamic characteristics of any helicopter can be simulated.

Figure 9:
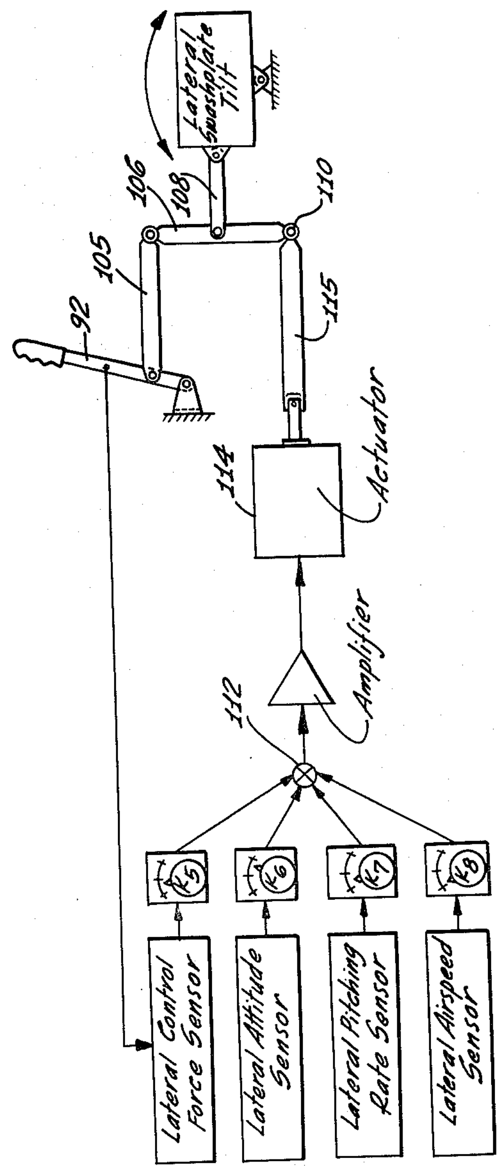
FIG. 9 is a diagram of the portion of an automatic stabilization equipment that relates to the lateral rolling motions of the helicopter.

FIG. 9 shows a schematic of the lateral stabilization system which is essentially identical to the longitudinal system described above. Here again the cyclic control stick 92 controls lateral tilt of the swashplate by means of a push-pull rod 105, a mixing linkage 106 and a push-pull rod 108. If the automatic stabilization equipment is turned off, the pivot point 110 remains fixed relative to the air frame so that all of the lateral motion of the cyclic control stick 92 is transmitted to the swashplate. For lateral control, the automatic stabilization system employs a sensor to sense lateral control stick force, a sensor to sense lateral aircraft attitude in space, a sensor to sense the lateral pitching rate of the aircraft and a sensor to sense the lateral translational air speed of the aircraft. The electric output signals from these four sensors are passed through electrical gain control units $K_5$, $K_6$, $K_7$ and $K_8$ respectively, and are electrically mixed together at point 12. The signals are then amplified as required to drive an electro-mechanical actuator 114. The actuator 114 operates a push-pull rod 115 that is connected to the mixing linkage 106 at the point 110.

The effects of the gain controls $K_5$, $K_6$, $K_7$ and $K_8$ are similar to the previously described effects of gain controls $K_1$, $K_2$, $K_3$ and $K_4$.

*$K_5$ Varies Manual Control Sensitivity*

$K_5<0$; electronic system shifts point 110 in the appropriate direction to diminish manual control sensitivity $K_5=0$; electronic system has no effect on manual control sensitivity $K_5>0$; electronic system shifts point 110 in the appropriate direction to magnify manual control sensitivity

*$K_6$ Varies Static Attitude Stability and Natural Frequency*

$K_6<0$; electronic system maneuvers point 110 to diminish the static stability and natural frequency of the aircraft $K_6=0$; electronic system has no effect on the static stability and natural frequency of the aircraft $K_6>0$; electronic system maneuvers point 110 to increase the static stability and natural frequency of the aircraft

*$K_7$ Varies Dynamic Attitude Stability and Damping*

$K_7<0$; electronic system maneuvers point 110 to diminish the dynamic stability and damping of the aircraft $K_7=0$; electronic system has no effect on dynamic stability and damping of the aircraft $K_7>0$; electronic system maneuvers point 110 to increase the dynamic stability and damping of the aircraft

*$K_8$ Varies Translational Velocity Stability*

$K_8<0$; electronic system maneuvers point 110 to diminish the translational velocity stability of the aircraft $K_8=0$; electronic system has no effect on translational velocity stability of the aircraft $K_8>0$; electronic system maneuvers point 110 to increase the translational velocity stability of the aircraft FIG. 10 is a schematic of the directional artificial stabilization system. This system operates on the same principle as the systems previously described except that it is basically more simple requiring only two sensors to sense:

*a.* Directional control (rudder pedals 32) force
*b.* Directional aircraft turning rate As in the longitudinal and lateral artificial stabilization systems, these sensors are readily available commercial components which are well known to those skilled in the art of automatic flight control. The electrical output signals from these sensors are passed through electrical gain control units $K_9$ and $K_{10}$ and electrically mixed together at point 116. These signals are then amplified as required and used to drive the electro-mechanical actuator 118. The force from this actuator is transmitted through the push-pull rods 120, 122 and the mixing linkage 124 to produce change in the collective pitch of the anti-torque rotor as shown schematically in FIG. 10.

If the artificial stabilization equipment is turned off, the pivot point 125 remains fixed relative to the air frame and all the motion of the cyclic control stick 92 is transmitted through the lever system to the anti-torque rotor. If the artificial stabilization equipment is turned on the force produced by the actuator 118 is transmitted to the anti-torque rotor through a push-pull rod 126, the previously mentioned push-pull rod 122 and the mixing linkage 124.

The effects of the gain controls $K_9$ and $K_{10}$ will now be described:

*$K_9$ Varies Manual Control Sensitivity*

$K_9<0$; electronic system shifts point 125 to diminish manual control sensitivity $K_9=0$; electronic system has no effect on manual control sensitivity $K_9>0$; electronic system shifts point 125 to magnify manual control sensitivity

*$K_{10}$ Varies Dynamic Directional Stability and Damping*

$K_{10}<0$; electronic system shifts point 125 to diminish the dynamic directional stability and damping of the aircraft $K_{10}=0$; electronic system has no effect on the dynamic directional stability and damping of the aircraft $K_{10}>0$; electronic system shifts point 125 to increase the dynamic directional stability and damping of the aircraft By setting the gain controls $K_9$ and $K_{10}$ in the proper combination the directional dynamic characteristics of any helicopter can be simulated.

My description in specific detail of the selected embodiments of the invention will suggest various changes, substitutions and other departures from my disclosure within the spirit and scope of the appended claims. For example, the previously described curtain members may be provided with springs as shown in FIG. 11 and the base structure may be of octagonal configuration and may be divided into several compartments or plenum chambers as shown in FIGS. 12 and 13.

In the modification of the invention shown in FIG. 11, the structure is largely identical with the structure shown in FIG. 3 as indicated by the use of corresponding numerals to indicate corresponding parts. The modification consists in the addition of a plurality of springs 135 to exert downward pressure on the bars 42*a* that carry the downwardly extending bristles 44*a*. The springs 135 are compression coil springs which seat in bores 136 in the bars 42*a*. The springs 135 are added to exert downward forces that make the curtains more efficient for their purpose.

The base structure, generally designated 34*c* in FIG. 12 is of octagonal configuration in plan being formed with an octagonal top wall 138 and a continuous side wall 140. The interior of the base structure 34*c* is divided by partitions 142 into eight separate plenum chambers 144*a*–144*h*. The top wall 138 is formed with eight inlet ports 145 for the eight plenum chambers respectively and suitable means (not shown) of the character heretofore described is provided to deliver compressed air at equal rates to the eight inlet ports.

The stabilizing effect of providing a plurality of independent plenum chambers in the base structure may be understood by reference to FIG. 13. In FIG. 13 the base structure 34*c* is tilted so that the left edge of the base structure is closer to the ground than the right edge. The effect of the tilt is to restrict the escape of air from the plenum chamber 144*a* under the left edge of the base structure with consequent rise in pressure in the plenum chamber. On the other hand, the effect of the tilt is to increase the gap between the ground and the right edge of the base structure to increase the freedom of discharge of air from the plenum chamber 144*e* with consequent lowering of pressure in the plenum chamber. Thus the rise in pressure in the left plenum chamber 144*a* and the simultaneous lowering of pressure in the right plenum chamber 144*e* creates correcting forces that tend to restore the base structure to its normal position parallel to the ground.

I claim:

1. In a trainer for a hovering type aircraft, the combination of: an aircraft assembly including powered means for hovering and flight and including flight controls; an air cushion vehicle constituting a mobile base structure constructed to provide an air cushion under the mobile base structure; and rigid means rigidly mounted on said base structure and extending upward from the base structure and pivotally connected to the aircraft assembly at a point on the assembly to give the assembly freedom to rotate relative to the base structure about a point on the assembly on an upright axis that is fixed relative to the base structure and to tilt laterally about said point whereby the attitude of the aircraf assembly is aerodynamically determined by the flight controls, said base structure being movable on an air cushion along the ground in response to the aerodynamic forces generated by the aircraft assembly and being constructed to provide the air cushion with characteristics for resisting tilting movements thereon created at said point by the aerodynamic forces.

2. A combination as set forth in claim 1 in which said point is at least approximately at the center of gravity of the assembly.

3. A combination as set forth in claim 1 in which the aircraft assembly develops insufficient lift to carry the base structure.

4. A combination as set forth in claim 1 which includes releasable means to prevent relative rotation of the aircraft assembly about said upright axis to reduce the burden of control on the student pilot.

5. A combination as set forth in claim 1 which includes releasable means to immobilize the base structure to reduce the burden of control on the student pilot.

6. A combination as set forth in claim 1 in which said means to maintain air under pressure includes power-actuated blower means carried by the base structure.

7. A combination as set forth in claim 1 in which said base structure forms a plenum chamber open at the bottom to contain a body of air for supporting the base structure; and in which the base structure has yieldable curtain members extending downward around the plenum chamber to retard discharge of air from the plenum chamber.

8. A combination as set forth in claim 1 which includes ground wheels mounted on the base structure, said wheels being normally retracted for complete support of the base structure by air and being extendible downward to positions for supporting the base structure in the absence of air support.

9. A combination as set forth in claim 1 in which said base structure forms at least one plenum chamber open at the bottom to contain a body of air for supporting the base structure; in which the base structure has yieldable curtain members extending downward around the plenum chamber to retard discharge of air therefrom; and which includes means yieldingly urging said curtain members downward.

10. A combination as set forth in claim 1 in which said base structure has a plurality of downwardly extending portions forming a plurality of independent plenum chambers with plenum chambers on the opposite sides of the base structure, whereby tilting of the base structure towards one side restricts the escape of air from the plenum chamber on said one side and increases the freedom for escape of air from the plenum chamber on the opposite side to create a pressure differential to oppose the tilt.

11. In a trainer for a hovering type aircraft, the combination of: an aircraft assembly including powered means for hovering and flight and including flight controls; an air cushion vehicle constituting a base structure; and rigid means rigidly mounted on the base structure and extending upward from the base structure, said rigid means being connected to the aircraft assembly at a point on the aircraft assembly with freedom for the aircraft assembly to rotate relative to the base structure abou said point on an upright axis that is fixed relative to the hase structure and to tilt laterally about said point whereby the attitude of the aircraft assembly is aerodynamically determined by the flight controls, said rigid means being freely extensible relative to the base structure along said axis through a range of levels whereby the elevation of the aircraft assembly within said range is determined by aerodynamic forces generated by the assembly, said base structure being movable on an air cushion along the ground in response to the aerodynamic forces generated by the aircraft assembly and being stable to resist tilting movements thereon created at said point by the aerodynamic forces throughout said range of levels.

12. A combination as set forth in claim 11 in which said point is at least approximately at the center of gravity of the assembly and in which means are disposed in coupled relationship with the aircraft assembly and the base structure to provide air for the air cushion on which the base structure in movable.

13. A combination as set forth in claim 11 in which the aircraft assembly develops insufficient lift to carry the base structure.

14. A combination as set forth in claim 11 which includes releasable means to hold the aircraft assembly at a fixed level relative to the base structure to reduce the burden of control on the student pilot and in which the base structure is constructed to oppose any tilt for the operation of the base structure as a stable platform.

15. In a trainer for a hovering type aircraft, the combination of:

an aircraft assembly including powered means for hovering and flight and including flight controls;

a base structure having greater weight than the lift capacity of the aircraft assembly;

means coupled to the base structure to maintain air under pressure between the base structure and the ground to support the base structure out of contact with the ground for minimum resistance to travel of the base structure, the base structure being constructed to direct air against the ground at widely spaced points for stability of the base structure, the base structure being constructed to oppose any tilt of the base structure and maintain a stable platform; and means connecting the aircraft assembly to the base structure for moving the base structure over the ground in response to the aerodynamic forces generated by the aircraft assembly, said connecting means being movable through a particular range relative to the aircraft assembly and the base assembly to limit the distance between the aircraft assembly and the base structure thereby limiting the range of elevation of the aircraft assembly above the ground, said connecting means providing a pivotable relationship between the aircraft assembly and the base structure to produce a freedom for maneuver of the aircraft assembly within said range of elevation, said connecting means extending rigidly a sufficient distance above the ground level to keep the aircraft assembly out of contact with the ground throughout the range for freedom for maneuver.

16. In a trainer for a hovering type aircraft, the combination of: a base structure; means coupled to the base structure for providing an air cushion to lift only the base structure and to support the base structure close to the ground in a stable manner with freedom for the base structure to move in all directions along the ground; an aircraft assembly including powered means for hovering and flight and flight controls; and rigid means rigidly mounted on the base structure, said rigid means rotatably and tiltably connecting said aircraft assembly with said base structure to permit aerodynamic maneuvering of the aircraft assembly and to permit the aircraft assembly to propel the base structure along the ground, said connecting means being extensible through a given range of levels to permit the aircraft assembly to ascend and descend relative to the base structure, the range of vertical maneuver of the aircraft assembly being limited to said range, said base structure being laterally extensive to underlie the aircraft assembly and intercept the aircraft assembly to limit the tilt of the aircraft assembly and to keep the aircraft assembly from tilting into contact with the ground.

17. In a trainer for a hovering type aircraft, the combination of: a base structure; means coupled to the base structure for providing an air cushion to lift only the base structure and to support the base structure close to the ground in a stable manner with freedom for the base structure to move in all directions along the ground; an aircraft assembly including powered means for lifting only the aircraft assembly and for hovering and flight and flight controls; means coupled to the aircraft assembly and including a rigid assembly of upright telescoped members with the lowermost member of the telescoped assembly rigidly mounted on the base structure and with the uppermost member of the telescoped assembly pivotally connected to the aircraft assembly, said telescoped assembly including at least one pair of members slideable axially relative to each other to permit the aircraft assembly to rise and fall relative to the base structure.

18. A combination as set forth in claim 17 in which said telescoped assembly includes two members that are rotatable relative to each other to permit the aircraft assembly to rotate relative to the base structure; and in which the aircraft assembly is pivoted to the telescoped assembly wtih freedom to tilt relative thereto in all directions.

19. In a trainer for a hovering type aircraft, the combination of: a base structure; means coupled to the base structure for providing an air cushion to support the base structure close to the ground in a stable manner with freedom for the base structure to move in all directions along the ground; an aircraft assembly including powered means for obtaining a hovering and flight of only the aircraft assembly and for providing flight controls; and rigid upright means rigidly mounted on said base structure and connecting a fixed point on the aircraft assembly to the base structure on the axis of the upright means to obtain the propelling of the base structure by the aircraft assembly along the ground, said upright means incorporating joint means to provide for a rotation and tilt of the aircraft assembly relative to the base structure in all directions, said upright means being extensible and contractible through a particular range of elevations to provide for an aerodynamic maneuvering of the aircraft assembly within said particular range.

20. A combination as set forth in claim 19 in which said upright means has a lower portion with a substantially vertical axis, and an upper portion that extends laterally from the vertical axis to clear the aircraft assembly and returns to the vertical axis at a point spaced above the lower portion, said aircraft assembly being mounted on said upright means at said point at approximately the center of gravity of the aircraft assembly combined with the weight of a pilot.

21. A combination as set forth in claim 19 in which said base structure is provided with a plurality of outriggers normally spaced above ground level but positioned to contact the ground to resist tipping of the base structure.

22. In a trainer for a hovering type aircraft, the combination of: a base structure; means to support the base structure close to the ground in a stable manner with freedom for the base structure to move in all directions along the ground; an aircraft assembly including powered means for hovering and flight and flight controls; upwardly extending means on said base structure for connecting the aircraft assembly to the base structure to permit the aircraft assembly to propel the base structure along the ground, said upwardly extending means incorporating joint means to permit the aircraft assembly to rotate and tilt relative to the base structure in all directions, said upright means being extensible and contractible through a given range of elevations to permit the aircraft assembly to be aerodynamically maneuvered within said range; an air passage extending from the aircraft assembly through said upwardly extending means to said base structure; powered means on the aircraft assembly to force air into and through said passage; and means on said base structure in communication with said air passage to receive air therefrom and to maintain air under pressure between the base and the ground to support the base structure out of contact with the ground to permit the base structure to travel over the ground in response to the aerodynamic forces created by the aircraft assembly and with minimum resistance to the aerodynamic forces, the air being directed against the ground at widely spaced points for stability of the base structure to resist tilting of the base structure by the aerodynamic forces.

23. In an apparatus for training a pilot to fly a hovering type aircraft, the combination of: a base structure; means to support the base structure close to the ground in a stable manner with freedom for the base structure to move in all directions along the ground; an aircraft assembly including powered means for hovering and flight and flight controls; upwardly extending means on said base structure connecting the aircraft assembly to the base structure to permit the aircraft assembly to propel the base structure along the ground, said upwardly extending means permitting the aircraft assembly to rotate and tilt relative to the base structure in all directions and being extensible and contractible through a given range of elevations to permit the aircraft assembly to be aerodynamically maneuvered within said range; and automatic stabilization means operatively connected to said flight controls and exercising incomplete stabilization control to leave a margin of control to be exercised by the pilot.

24. A combination as set forth in claim 23 in which said automatic stabilization means is adjustable relative to the degree of control it exercises on the flight controls whereby the degree of control may be progressively reduced in the course of the training of a pilot.

25. In an apparatus for training a pilot to fly a hovering type aircraft, the combination of: a base structure; means to support the base structure close to the ground in a stable manner with freedom for the base structure to move in all directions along the ground; an aircraft assembly including powered means for hovering and flight and flight controls; upwardly extending means on said base structure connecting the aircraft assembly to the base structure to permit the aircraft assembly to propel the base structure along the ground, said upwardly extending means incorporaing joint means to permit the aircraft assembly to rotate and tilt relative to the base structure in all directions; and automatic means operatively connected to said flight controls to cause the aircraft assembly to simulate flight characteristics that differ from flight characteristics that are inherent in the aircraft assembly, said automatic means including means to sense control forces applied to the flight controls by the pilot and including means to sense the behavior of the aircraft assembly.

26. In an apparatus for training a pilot to fly a hovering type aircraft, the combination of: a base structure; means to support the base structure close to the ground in a stable manner with freedom for the base structure to move in all directions along the ground; an aircraft assembly including powered means for hovering and flight and flight controls; upwardly extending means on said base structure connecting the aircraft assembly to the base structure to permit the aircraft assembly to propel the base structure along the ground, said upwardly extending means incorporating joint means to permit the aircraft assembly to rotate and tilt relative to the base structure in all directions, said upright means being extensible and contractible through a given range of elevations to permit the aircraft assembly to be aerodynamically maneuvered with said range; and automatic means operatively connected to said flight controls to cause the aircraft assembly to simulate flight characteristics that differ from flight characteristics that are inherent in the aircraft assembly, said automatic means including means to sense control forces applied to the flight controls by the pilot and including means to sense the behavior of the aircraft assembly.

27. In a trainer for a hovering type aircraft, the combination of: an aircraft assembly including powered means for hovering and flight and flight controls; a base structure connected to the aircraft assembly with freedom for the aircraft assembly to rotate relative to the base structure about an upright axis and tilt laterally relative to the base structure about a point on said axis whereby the attitude of the aircraft assembly is aerodynamically determined by the flight controls, the connection between the aircraft assembly and the base structure providing a range of vertical movement of the aircraft relative to the base structure along said axis whereby the student pilot may fly the aircraft assembly in a self-supporting manner within said range; means coupled to the base structure for providing a stable platform for the base structure; and indicating means operated by the vertical movement of the aircraft assembly relative to the base structure to indicate to the pilot when the aircraft reaches at least one of the two limits of said range of relative vertical movement.

References Cited in the file of this patent

UNITED STATES PATENTS

| | | |
|---|---|---|
| 1,007,467 | Mangels | Oct. 31, 1911 |
| 2,524,238 | Soule | Oct. 3, 1950 |
| 2,591,752 | Wicklund | Apr. 8, 1952 |
| 2,711,594 | Hickey | June 28, 1955 |
| 2,896,948 | Jacobs | July 28. 1959 |
| 2,916,832 | Hofman | Dec. 15, 1959 |
| 2,953,320 | Parry | Sept. 20, 1960 |
| 2,954,614 | Vogt | Oct. 4, 1960 |
| 2,989,269 | Le Bel | June 20, 1961 |
| 3,067,528 | Augusta | Dec. 11, 1962 |
| 3,082,836 | Billman | Mar. 26, 1963 |

FOREIGN PATENTS

| | | |
|---|---|---|
| 854,211 | Great Britain | Nov. 16, 1960 |
| 881,928 | Great Britain | Nov. 8, 1961 |

OTHER REFERENCES

"Analyzing Air Car Designs," Science & Mechanics, June 1960; pages 73–77.

Aviation Week (publication), pp. 115, 116, July 6, 1959.